(12) United States Patent  (10) Patent No.: US 7,324,235 B2
Yamazaki  (45) Date of Patent: Jan. 29, 2008

(54) IMAGING APPARATUS CAPABLE OF EFFICIENT MANAGEMENT OF PAGE MEMORY

(75) Inventor: Takahiro Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 932 days.

(21) Appl. No.: 10/334,832

(22) Filed: Jan. 2, 2003

(65) Prior Publication Data

US 2003/0151770 A1    Aug. 14, 2003

(30) Foreign Application Priority Data

Jan. 7, 2002   (JP)   ............... 2002-000218
Dec. 26, 2002  (JP)   ............... 2002-378303

(51) Int. Cl.
    *G06K 15/00*   (2006.01)
    *G06F 3/12*    (2006.01)
(52) U.S. Cl. ..................... 358/1.17; 358/518
(58) Field of Classification Search ............. 358/1.1, 358/1.9, 1.16, 1.17, 2.1, 444, 512, 514, 518, 358/524; 382/163, 167
    See application file for complete search history.

(56) References Cited

U.S. PATENT DOCUMENTS

| 5,249,061 | A | * | 9/1993 | Nagashima et al. | ......... 358/296 |
| 5,327,257 | A | * | 7/1994 | Hrytzak et al. | ............. 358/447 |
| 5,927,874 | A | * | 7/1999 | Kikuta et al. | .......... 400/120.02 |
| 6,031,569 | A | * | 2/2000 | Nobuoka et al. | ........ 348/220.1 |
| 6,384,935 | B1 | * | 5/2002 | Yamazaki | ................... 358/1.9 |
| 6,542,936 | B1 | * | 4/2003 | Mayle et al. | ............... 709/250 |
| 6,850,995 | B1 | * | 2/2005 | Shishizuka et al. | .......... 710/20 |
| 2003/0031362 | A1 | * | 2/2003 | Keithley | .................... 382/167 |
| 2003/0151770 | A1 | | 8/2003 | Yamazaki | |
| 2003/0154178 | A1 | * | 8/2003 | McIntyre et al. | .............. 707/1 |

FOREIGN PATENT DOCUMENTS

| JP | 9-099589 | 4/1997 |
| JP | 9-252412 | 9/1997 |
| JP | 9-284436 | 10/1997 |

OTHER PUBLICATIONS

U.S. Appl. No. 10/928,481, filed Aug. 30, 2004, Hattori, et al.

* cited by examiner

*Primary Examiner*—Gabriel Garcia
(74) *Attorney, Agent, or Firm*—Oblon, Spivak, McClelland, Maier & Neustadt, P.C.

(57) ABSTRACT

An imaging apparatus acquires image information while analyzing the image information into pixel data of multiple color components, and reproduces an image from the image information. The imaging apparatus comprises a memory region reservation unit that reserves memory regions for storing the pixel data of the multiple color components when acquiring the image information. Each memory region is assigned to one of the multiple color components. Also provided is a color determination unit that makes a color determination as to whether each of the multiple color components is recognized as being significant in the pixel data of the image information. In addition, a memory region releasing unit is provided that releases the memory region assigned to the color component that is not recognized by the color determination unit.

20 Claims, 12 Drawing Sheets

IMAGING APPARATUS CAPABLE OF EFFICIENT MANAGEMENT OF PAGE MEMORY

BACKGROUND OF THE INVENTION

1. Field of the Invention

The present invention generally relates to a full-color imaging apparatus with page memory, such as copying machines, printers, facsimile machines, and combinations of these, and more particularly to a full-color imaging apparatus capable of efficiently managing and controlling the use of page memory.

2. Description of the Related Art

In full-color imaging apparatuses, a technique of reading in advance for color determination is known. For example, JPA 9-99589 discloses a technique for reading an original image to determine whether the image is a monochromatic image or a full-color image prior to reproducing the image. After the determination, image reproduction, including reading pixel data out of the memory, is carried out.

Another full-color imaging technique is to read a single color component at a reading operation and to proceed with image reproduction, without reading all the colors in advance, on condition that a black image is first reproduced.

In general, a full-color imaging apparatus, such as a color copier, reads the original into four color components of black (K), yellow (Y), cyan (C), and magenta (M), and stores the respective color components in the memory to reproduce the color image.

However, the conventional advance reading technique for color determination prevents the productivity from being kept high through the entire imaging process. The latter technique of first reproducing the black image without conducting advance reading can not be applied to those imaging apparatuses that are not designed so as to reproduce the black image first.

Another problem in the above-described conventional full-color imaging apparatuses is that, even if the original image does not contain all of the color components of black, yellow, cyan, and magenta, the scanned image is maintained in the memory regions allocated to the respective color components, which prevents efficient usage of memory regions.

SUMMARY OF THE INVENTION

Accordingly, it is an object of the present invention to overcomes these defects in the prior art techniques, and to provide an imaging apparatus that reads all the color components at a single reading operation and utilizes the memory in an efficient manner to prevent degradation of productivity.

To achieve the object, in one aspect of the invention, an imaging apparatus reads an image from the original while analyzing the image into multiple color components, and reproduces the image. This imaging apparatus comprises (a) a memory region reservation unit that reserves memory regions for storing the pixel data of the multiple color components when reading the image, each memory region being assigned to one of the multiple color components, (b) a color determination unit that makes a color determination whether each of the color components is recognized as significant in the pixel data read from the original, and (c) a memory region releasing unit that releases the memory region assigned to the color component that is not recognized as significant by the color determination unit.

If the image read from the original is in a single color, the memory region releasing unit releases at least one of reserved memory regions assigned to the color components that do not substantially contribute to the single color.

If the imaging apparatus reads the image from multiple pages of the original to reproduce the image in a single sheet, the memory region releasing unit releases the memory region assigned to the color component that is not recognized in any of the multiple pages of the original.

Preferably, the imaging apparatus further comprises an image data incorporation unit that adds arbitrary image data to the pixel data read from the original when reproducing the image. In this case, the memory region releasing unit releases the memory region assigned to the color component that is not recognized in either the pixel data read from the original or the image data to be added The image data to be added are, for example, fixed characters, including the page number and the date.

The imaging apparatus may further comprise a communication unit that acquires the image data to be added through a network. The communication unit can acquire the image data comprised of red, green, and blue components, as well as the image data comprised of yellow, magenta, cyan, and black components.

The imaging apparatus further comprises a pixel data transfer unit that transfers the pixel data stored in the associated memory regions to an external storage after the color determination unit has made the color determination.

This arrangement is suitable when, in the imaging apparatus, the pixel data transfer rate of the pixel data transfer unit is faster than the pixel data storing rate of the memory regions.

Alternatively, the imaging apparatus further comprises a pixel data transfer unit that transfers the pixel data of at least one color component from the page memory to an external storage before the color determination unit makes the color determination, and that transfers the pixel data of the rest of the color components recognized in the image read from the original after the color determination unit make the color determination.

This arrangement is suitable when the pixel data transfer rate of the pixel data transfer unit is slower than the pixel data storing rate of the memory regions.

For example, the pixel data transfer unit transfers the pixel data of the black component first from the memory region to the external storage before the color determination unit makes the color determination.

The imaging apparatus analyzes the image read from the original into the pixel data of yellow, magenta, cyan, and black components. The imaging apparatus can also analyze the image read from the original into the pixel data of red, green, and blue components.

Preferably, the imaging apparatus further comprises a first conversion unit that converts the pixel data comprised of red, green, and blue components into the pixel data comprised of yellow, magenta, cyan, and black components.

The first conversion unit includes a gamma conversion unit, a color correction unit, an under color removal unit, and a gradation processing unit.

The imaging apparatus may further comprise a second conversion unit that converts the pixel data comprised of yellow, magenta, cyan, and black components into the pixel data comprised of red, green, and blue components.

The second conversion unit includes a color conversion unit and a color density correction unit.

The imaging apparatus further comprises a web page implementation unit that implements a service provided on a Web site.

The imaging apparatus further comprises hardware resources required to reproduce the image, and one or more programs used in conjunction with the reproduction of the image.

The imaging apparatus according to the invention reads all of the predetermined color components at a single reading operation, and manages the memory regions in an efficient manner. Consequently, the productivity can be maintained high in full-color imaging operations.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE EMBODIMENTS

The details of the present invention will now be described with reference to the attached drawings.

Figure 1:
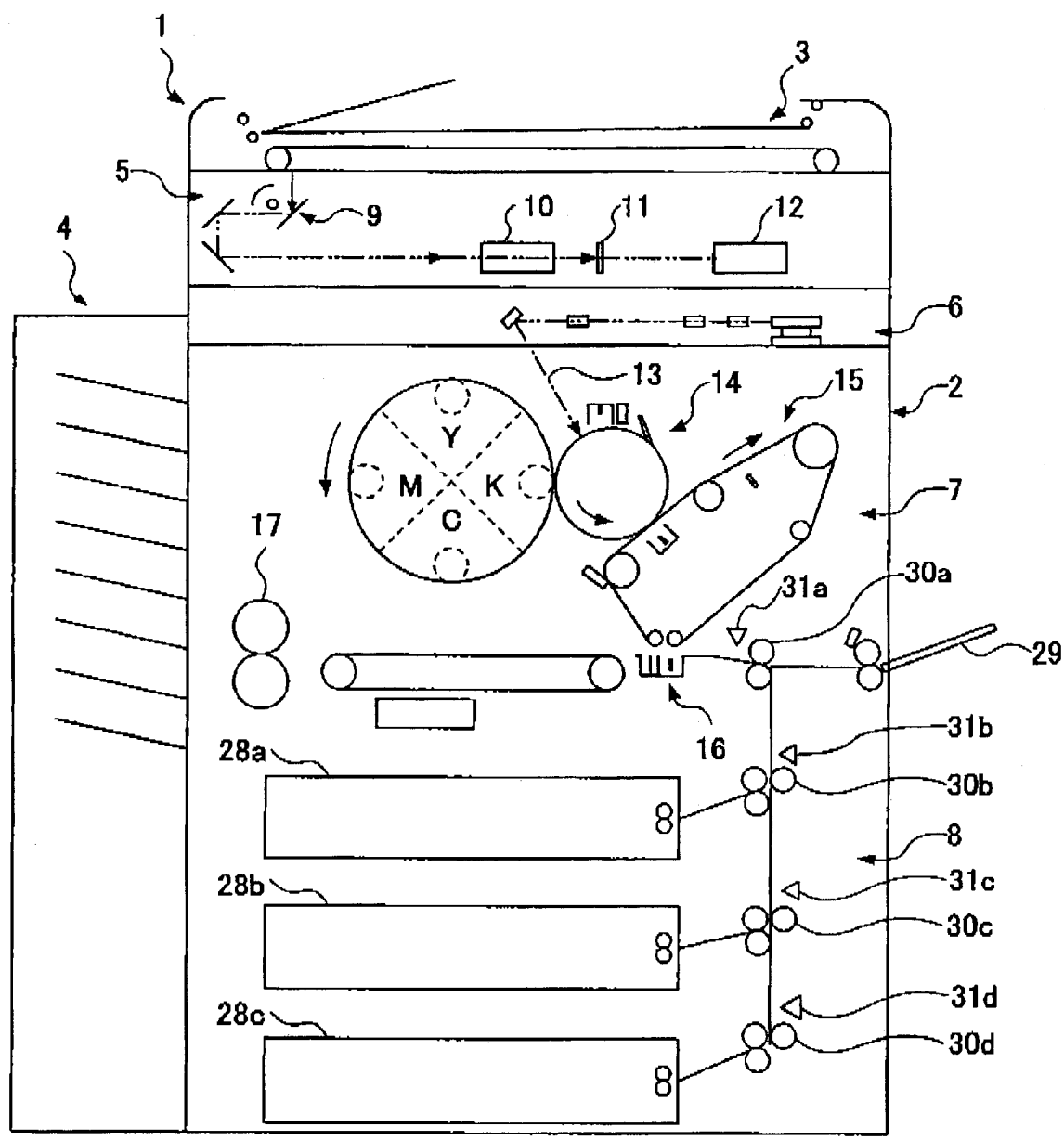
FIG. 1 schematically illustrates the structure of a digital hybrid imaging apparatus according to an embodiment of the invention.

FIG. 1 illustrates the structure of a digital hybrid imaging apparatus 1 furnished with the functions of a copying machine, a printer, and a facsimile machine. The digital hybrid imaging apparatus 1 includes a printer body 2, an automatic document feeder (ADF) 3, a sorter 4, and a scanner 5.

The printer body 2 has an optical writing unit 6, an engine 7, and a paper supply 8. The scanner 5 has a carriage 9 mounting a light source and mirrors, a lens 10, a CCD 11, and a buffer 12. The scanner 5 scans the original supplied from the ADF 3 to read the image formed on the original. The optical writing unit 6 has a laser source, a polygonal mirror, and other optical elements, and emits laser beam 13 containing pixel information, which is guided to the engine 7.

Figure 2:
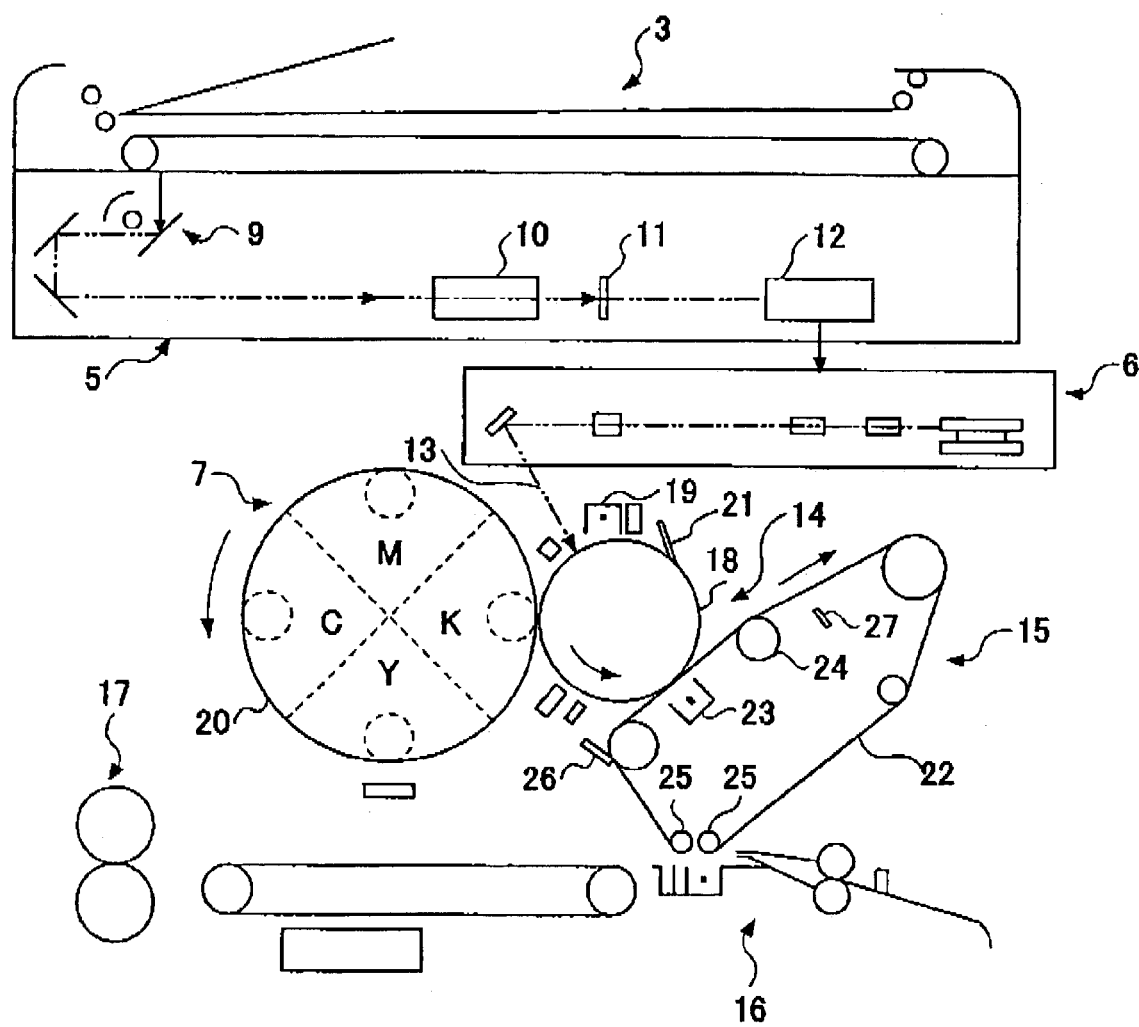
FIG. 2 illustrates the detailed structure of the engine part furnished in the digital hybrid imaging apparatus shown in FIG. 1.

FIG. 2 illustrates the detailed structure of the engine 7. The engine 7 has an image forming unit 14, a primary image transfer unit 15, a secondary image transfer unit 16, and an image fixing unit 17.

The image forming unit 14 includes a photosensitive drum 18, an electrostatic charger 19 placed around the photosensitive drum 18, a color developing unit 20, and a drum cleaner 21. The laser beam 13 emitted from the optical writing unit 6 is guided onto the charged photosensitive drum 18 to form an electrostatic latent image on it.

The color developing unit 20 contains toners of black (K), and three primitive colors, that is, yellow (Y), cyan (C) and magenta (M). These colors are hereinafter referred to as simply Y, M, C, and K. The electrostatic latent image formed on the charged photosensitive drum 18 is made visible by the color developing unit 20 to form a toner image.

The primary image transfer unit 15 has an intermediary transfer belt 22, a primary transfer section 23, a tension roller 24, a pair of secondary transfer rollers 25, a belt cleaner 26, and a reference position sensor 27. The primary image transfer unit 15 transfers the toner image formed on the photosensitive drum 18 onto the intermediary transfer belt 22.

The intermediary transfer belt 22 is kept apart from the surface of the photosensitive drum 18 by a contact/separation driving mechanism (not shown), except when receiving the toner image from the photosensitive drum 18. In other words, the intermediary transfer belt 22 is pressed against the photosensitive drum 18 only when the toner image is transferred from the photosensitive drum 18 onto the intermediary transfer belt 22.

The secondary image transfer unit 16 transfers the toner image formed on the intermediary transfer belt 22 onto paper (or another recording medium). The image fixing unit 17 fixes the toner image transferred on the paper through application of heat and pressure. The paper supply 8 has paper feed trays 28a-28c, a manual feed tray 29, a pair of resist rollers 30a, transport rollers 30b through 30d, and jam sensors 31a through 31d. Paper is supplied from the paper supply 8 to the secondary image transfer unit 16.

The ADF 3 supplies the original to the stage of the scanner 5, and collects the scanned original. The sorter 4 has multiple stages of sort bins, with which the sorter 4 receives and sorts out the ejected papers bearing the reproduced images.

Figure 3:
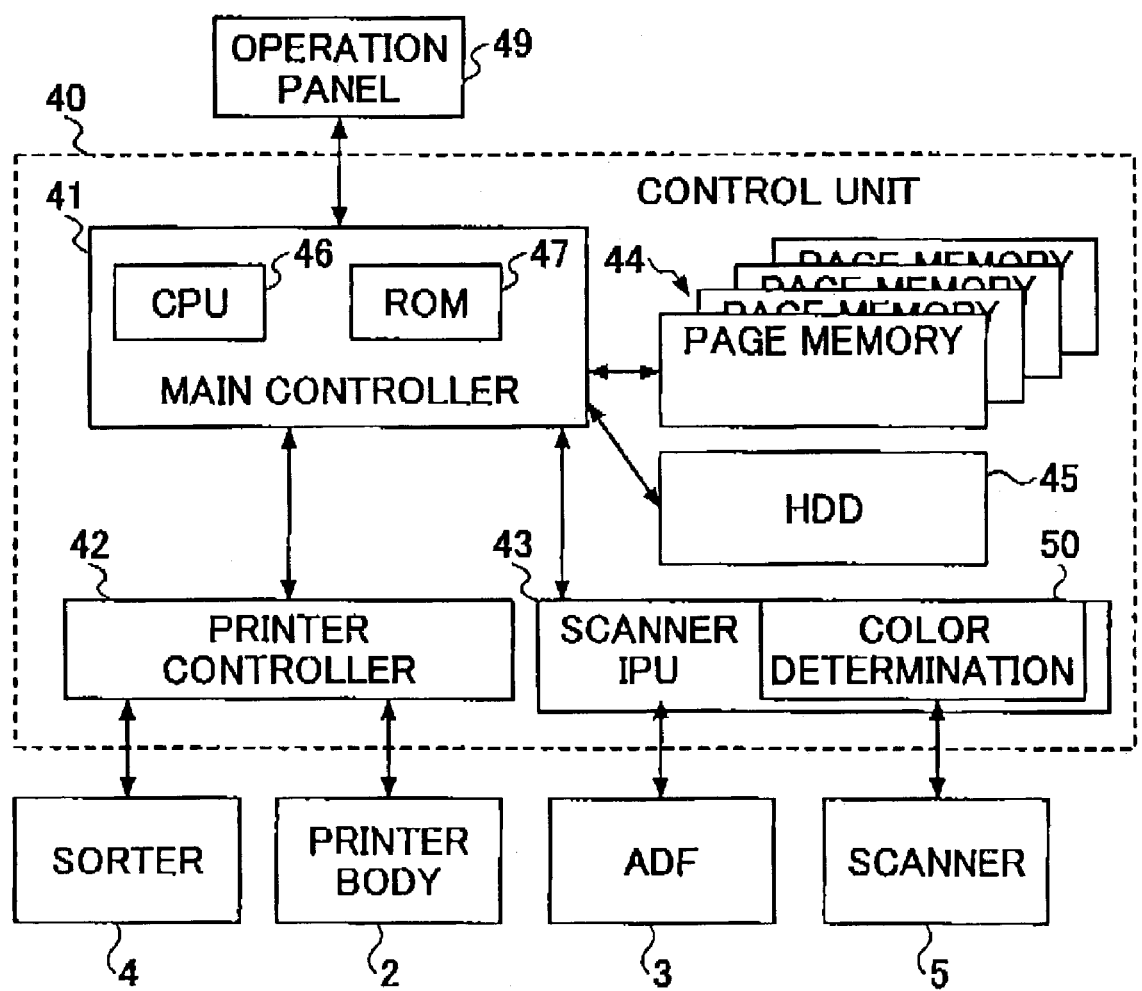
FIG. 3 is a block diagram showing the structure of the control unit of the digital hybrid imaging apparatus.

FIG. 3 is a block diagram of the control unit 40 of the digital hybrid imaging apparatus 1. The control unit 40 includes a main controller 41, a printer controller 42, a scanner IPU 43, and page memories 44, and a hard disk drive (HDD) 45 corresponding to an external storage. Each of the page memories 44 represents a memory region corresponding to a page frame. In YMCK color imaging, four page memory regions 44 are reserved for a sheet of original. In RGB (red, green and blue) color imaging, three page memory regions 44 are reserved. Each page memory region 44 corresponds to one of the color components of the scanned image, and stores associated color-separated pixel data. If a specific color component is not recognized (as being significant) in the scanned image through the color determination process, then the pixel data of such a non-recognized color are regarded as non-recognized pixel data.

The main controller 41 has a CPU 46 and ROM 47, and controls the entire operation of the digital hybrid imaging apparatus 1.

Although not shown in the drawing, the operation panel 49 has, for example, a print start key, a ten-key pad for inputting the number of copies, function setting keys for allowing the user to select the function of the digital hybrid imaging apparatus 1, system function setting keys for setting an imaging-relating function, and a liquid crystal touch panel.

The scanner IPU 43 amplifies the pixel signal read and produced by the scanner 5 from the original, and converts the scanned analog data into digital pixel data. The scanner IPU 43 has a color determination unit 50. The scanner IPU 43 also has patterned image data, and is capable of outputting an internal pattern image, such as fixed characters, in response to an instruction from the main controller 41.

The scanner IPU 43 also carries out prescribed gamma conversion and other processes, such as changing magnification or data processing designated by the operation panel 49 or the main controller 41. Then, the scanner IPU 43 supplies the processed digital pixel data of the effective imaging area to the main controller 41 at a prescribed timing.

The CPU 46 of the main controller 41 stores the pixel data supplied from the scanner IPU 43 in the associated page memory regions 44. Upon receiving an image reproduction request from the printer controller 42, the CPU 46 reads the requested pixel data out of the page memory regions 44 and supplies them to the printer controller 42. The printer controller 42 carries out gamma conversion and other processes in order to make the pixel data supplied from the main controller 41 properly match with the characteristics of the printer body 2, and supplies the processed pixel data to the optical writing unit 6 of the printer body 2. Then the original image is reproduced on paper based on the pixel data, as has been described above in conjunction with FIG. 2.

Figure 4:
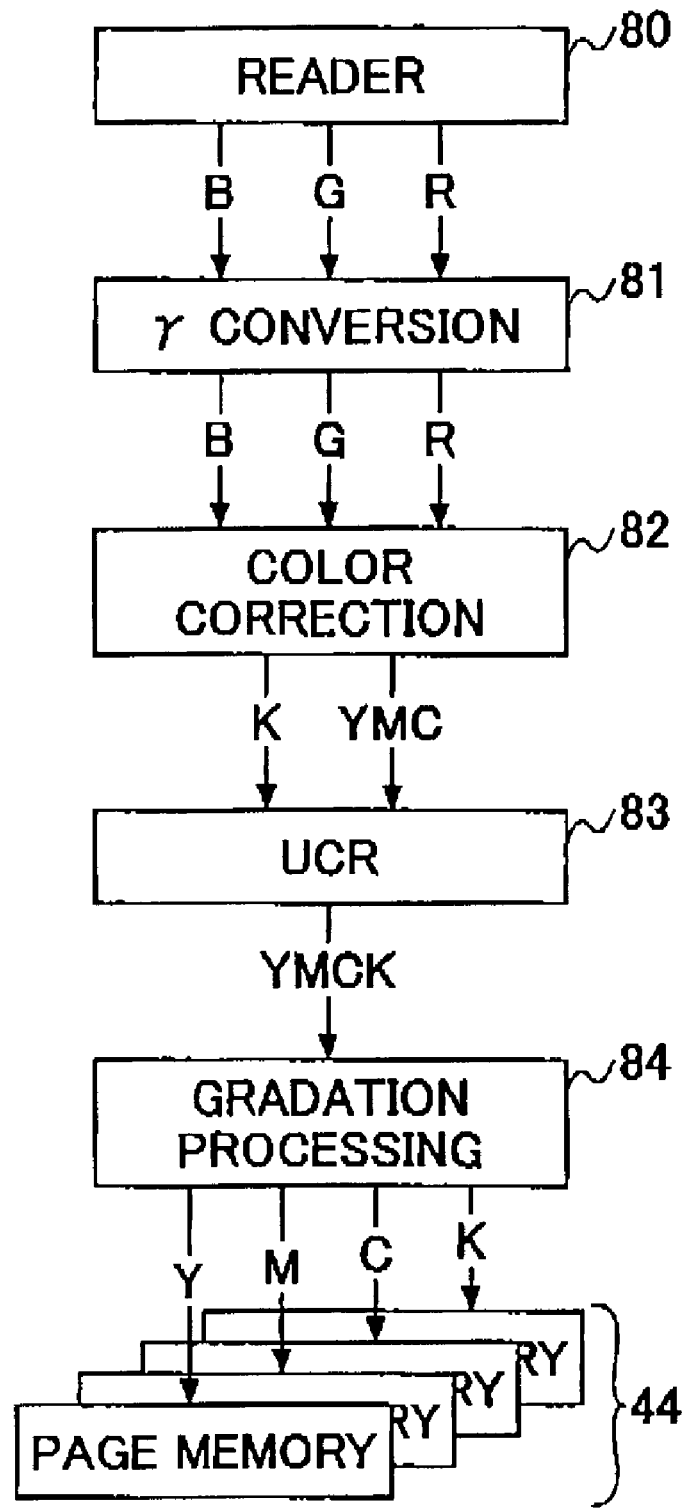
FIG. 4 is a hardware block diagram illustrating the RGB to YMCK conversion carried out prior to storing pixel data in the page memory regions.
Figure 5:
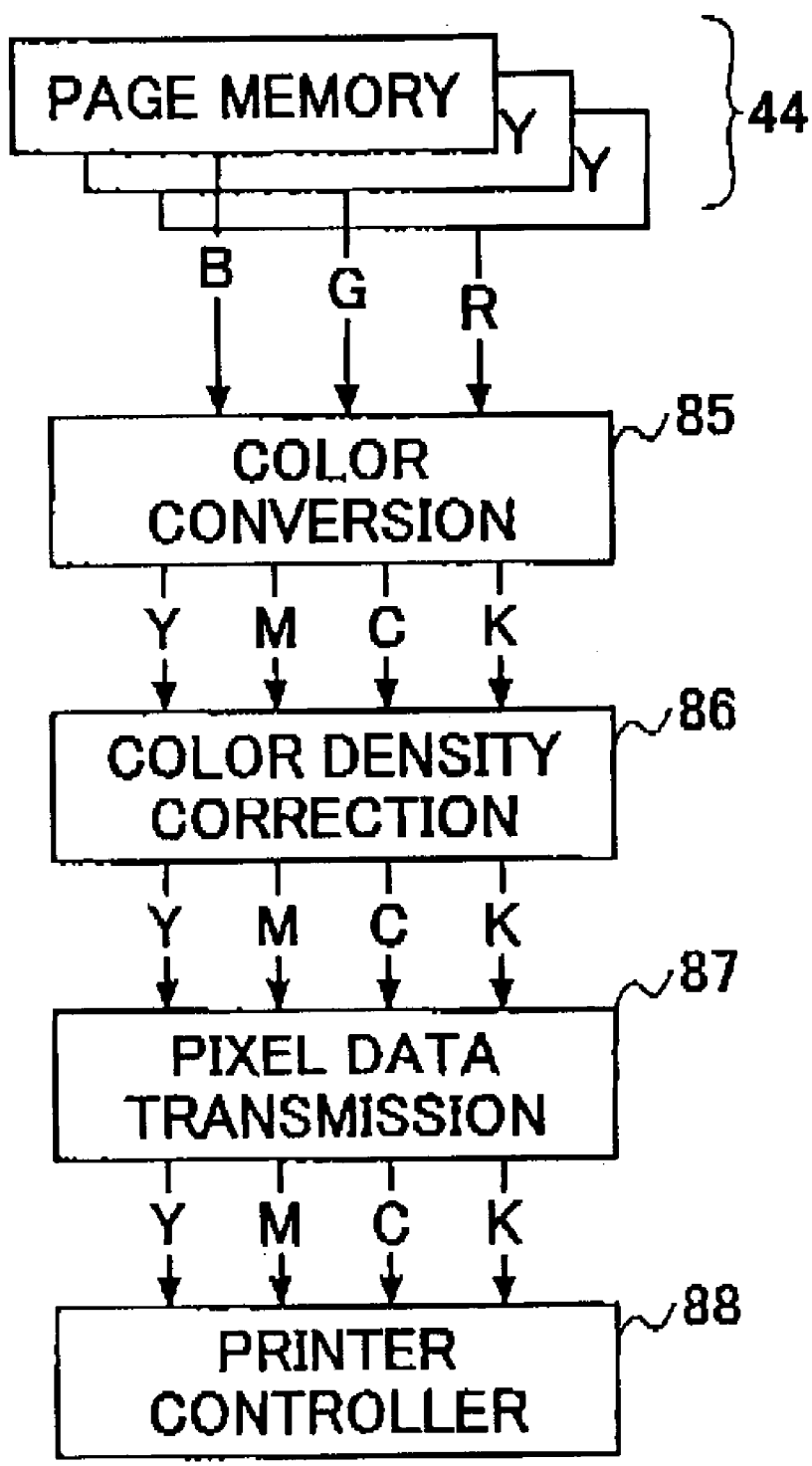
FIG. 5 is a hardware block diagram illustrating the RGB to YMCK conversion carried out prior to outputting pixel data to the printer.

FIG. 4 and FIG. 5 illustrate an example of pixel data processing, including the gamma conversion. In FIG. 4, the pixel data read as RGB components are converted into YMCK pixel data, and the YMCK pixel data are stored in the associated page memory regions 44.

The reader 80 is, for example, the scanner 5 illustrated in the example shown in FIG. 1 and FIG. 2. The gamma converter 81 adjusts the brightness of the output image based on the gamma value. The color correction unit 82 carries out various types of color correction, and converts the RGB pixel data into YMC pixel data and K pixel data. The UCR (under color removal) unit 83 removes under color components from the YMC pixel data and K pixel data, and outputs YMCK pixel data. The gradation processing unit 84 adjusts the gradation of the image (pixel data).

The gamma converter 81, the color correction unit 82, the UCR unit 83, and the gradation processing unit 84 are provided in the scanner IPU 43.

In this manner, the RGB pixel data read by the reader 80 are subjected to gamma conversion at the gamma converter 81, and then output as YMC pixel data and K pixel data from the color correction unit 82. The YMC pixel data and the K pixel data are input to the UCR unit 83 separately, and output as YMCK pixel data, which are then subjected to the gradation adjustment at the gradation processing unit 84. Finally, the pixel data having been subjected to the RGB/YMCK conversion are stored in the corresponding page memory regions 44.

In FIG. 5, to the contrary, image data are stored as RGB pixel data in the page memories 44 The RGB pixel data are read out of the associated page memory regions 44, and converted into YMCK pixel data by the color conversion unit 85 prior to the image reproduction. The converted YMCK pixel data are subjected to the adjustment of the color density at the color density correction unit 86, and the adjusted YMCK pixel data are transmitted from the pixel data transmission unit 87 to the printer controller 88 (that corresponds to the printer controller 42 in FIG. 3).

The color conversion unit 85, the color density correction unit 86, and the pixel data transmission unit 87 are provided in the main controller 41.

Thus, the digital hybrid imaging apparatus 1 is capable of converting RGB pixel data into YMCK pixel data for storage in the page memory regions 44, and is also capable of converting RGB pixel data stored in the page memory regions 44 into YMCK pixel data for reproduction by the printer.

Figure 6:
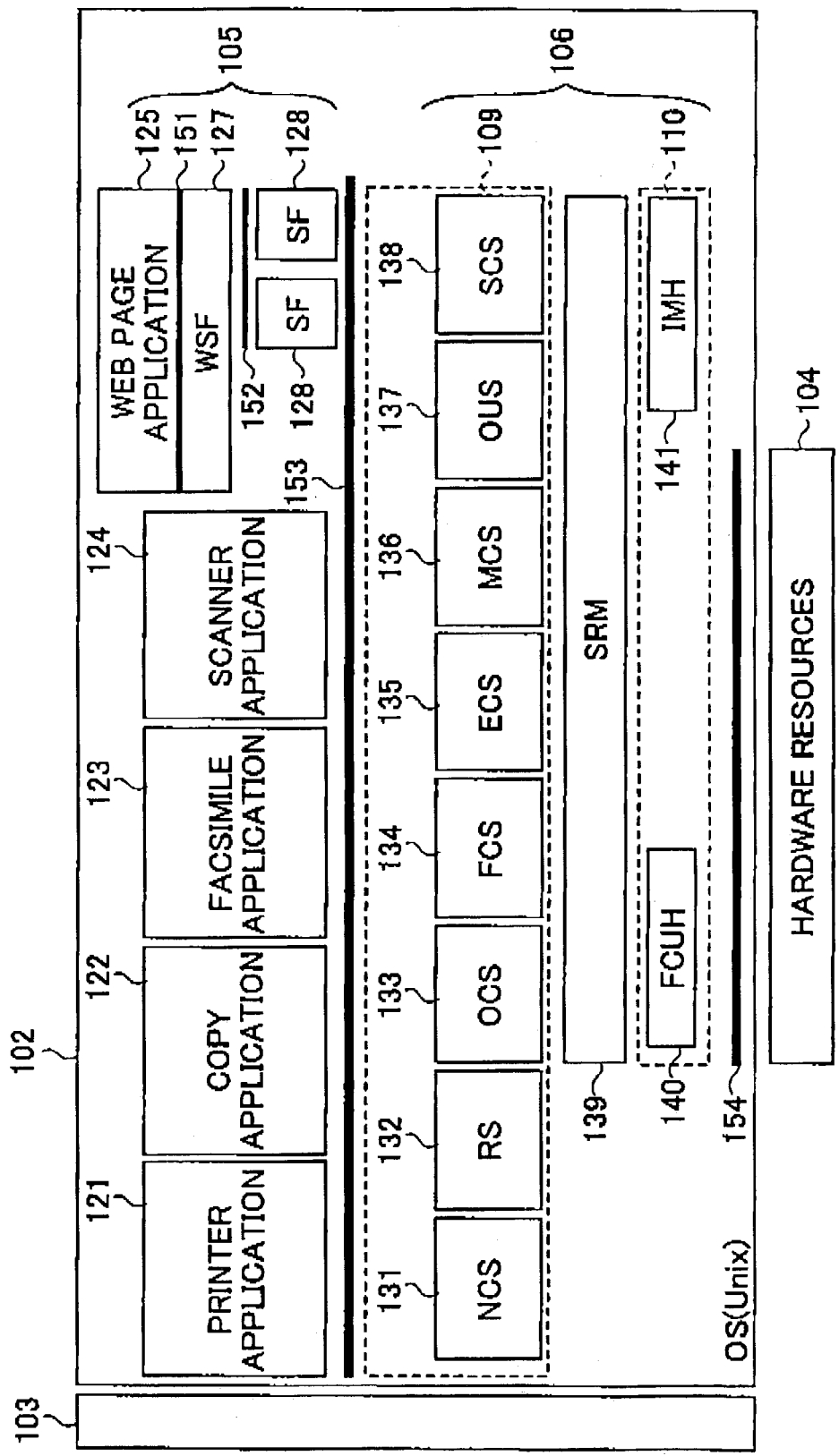
FIG. 6 illustrates the software structure of the digital hybrid imaging apparatus.

FIG. 6 illustrates the configuration of the software operating on the main controller 41.

When the digital hybrid imaging apparatus 1 is powered up, the activation processor 103 is first executed to activate the application layer 105 and the platform 106. The activation processor 103 reads the programs for the application layer 105 and the platform 106 out of the HDD 45, and transfers the programs to the memory regions to activate the application layer 105 and the platform 106.

The hardware resources 104 include the printer body 2, the scanner 5, the ADF 3, the sorter 4, and other hardware resources.

The software block 102 includes the application layer 105 and the platform 106 operating on the operating system (OS), such as UNIX (registered trademark). The application layer 105 includes various programs for implementing the user services associated with imaging processes of the printer, the copying machine, the facsimile machine, and the scanner, independently.

To be more precise, the application layer 105 includes printer application 121, copy application 122, facsimile application 123, scanner application 124, and web page application 125 (that corresponds to the web page implementing means), one or more common functions (SFs) 128, and Web service function (WSF) 127 provided between the Web page application 125 and the SFs 128.

The WSF 127 has an application program interface (API) 151 for receiving a processing request from the web page application 125 by means of the prescribed function defined in advance. Similarly, the group of SFs has the API 152 for receiving the processing request from the WSF 127 by means of the prescribed function defined in advance.

Upon receiving the processing request from the Web page application 125 via the API 151, the WSF 127 selects an appropriate common function (SP) 128 in response to the processing request, and supplies the processing request to the selected SF 128 via the API 152. Upon receiving the processing request via the API 152, the SF 128 implements the process in accordance with the processing request.

In the example shown in FIG. 6, the digital hybrid imaging apparatus 1 has two common functions (SFs) 128. In this example, one SF 128 processes network services, and the other SF 128 processes document management services.

The platform 106 includes a control service layer 109, a system resource manager (hereinafter, referred to as "SRM") 139, and a handler layer 110. The control service layer 109 interprets the processing request supplied from the application layer 105, and produces an acquisition request for the hardware resources 104. The SRM 139 manages one or more hardware resources 104, and adjusts the acquisition requests transmitted from the control service layer 109. The handler layer 110 controls the hardware resources 104 in response to the acquisition request from the SRM 139.

The control service layer 109 includes one or more service modules. In the example shown in FIG. 6, a network control service (NCS) 131, a delivery control service (DCS) 132, an operation panel control service (OCS) 133, a facsimile control service (FCS) 134, an engine control service (ECS) 135, a memory control service (MCS) 136, a user information control service (UCS) 137, and a system control service (SCS) 138 are included in the control service layer 109.

The platform 106 has an API 153 that receives a processing request from the application layer 105 based on a predefined function. The operating system (OS) executes the software contained in the application layer 105 and the platform 106 in parallel, as independent processes.

The purpose of NCS 131 is to distribute the data received from the network based on the respective protocols to the associated applications, and to coordinate data transmission from the applications to the network.

The NCS 131 controls the data communications with network appliances connected to the digital hybrid imaging apparatus 1 via the network based on, for example, the HTTP (hypertext transfer protocol) using HTTPD (hypertext transfer protocol daemon).

The purpose of DCS 132 is to control delivery of the stored data of documents. The purpose of OCS 133 is to control the operation panel that functions as information communication means between the operator and the entire operation of the digital hybrid imaging apparatus 1. The purpose of FCS 134 is to provide API services used to send a document produced in the application layer 105 as a facsimile through the PSTN or ISDN network, to register or quote facsimile data managed by the backup memory, to read a facsimile document, and to receive and print a facsimile.

The purpose of ECS 135 is to control the engine of the digital hybrid imaging apparatus 1, including the hardware resources 104. The purpose of MCS 136 is to control the memory, including acquiring and releasing memory regions, utilizing HDDs, and compressing and restoring the image data. The purpose of UCS 137 is to manage user information.

The purpose of SCS 138 includes application management, control of the operation panel, system image display, LED display, hardware resource management, control of interrupt application, etc.

SRM 139 cooperates with SCS 138 to control the system and manage the hardware resources 104. The purpose of SRM 139 includes coordinating the allocation of the hardware resources 104, such as a black and white laser printer 111 or color laser printer 112, in response to the acquisition request from a higher layer that requires the use of the hardware resources 104, and controlling the execution.

To be more precise, SRM 139 determines whether the requested hardware resource 104 is available or is being used by another acquisition request, and informs the higher layer of the availability of the hardware resources 104. In addition, SRM 139 schedules the use of the hardware resources 104, and directly implements the requests, such as paper feed operation and imaging operation by the printer engine, reservation for memory regions, producing a file, etc.

The handler layer 110 includes facsimile control unit handler (FCUH) 140 that controls a facsimile control unit (FCU), and image memory handler (IMH) 141 that allocates the memory regions to the processes and controls the allocated memory regions. The IMH 141 functions as a memory region controller, including a memory region reservation unit, memory region releasing unit, and pixel data transferring unit.

The SRM 139 and the FCUH 140 use the engine interface (I/F) 154 to provide process requests to the hardware resources 104. The engine interface (I/F) 154 transmits the process requests to the hardware resources 104 by means of a predefined function.

With the structure shown in FIG. 6, the digital hybrid imaging apparatus 1 carries out various processes commonly required among the applications at the platform 106 in a standardized manner.

Figure 7:
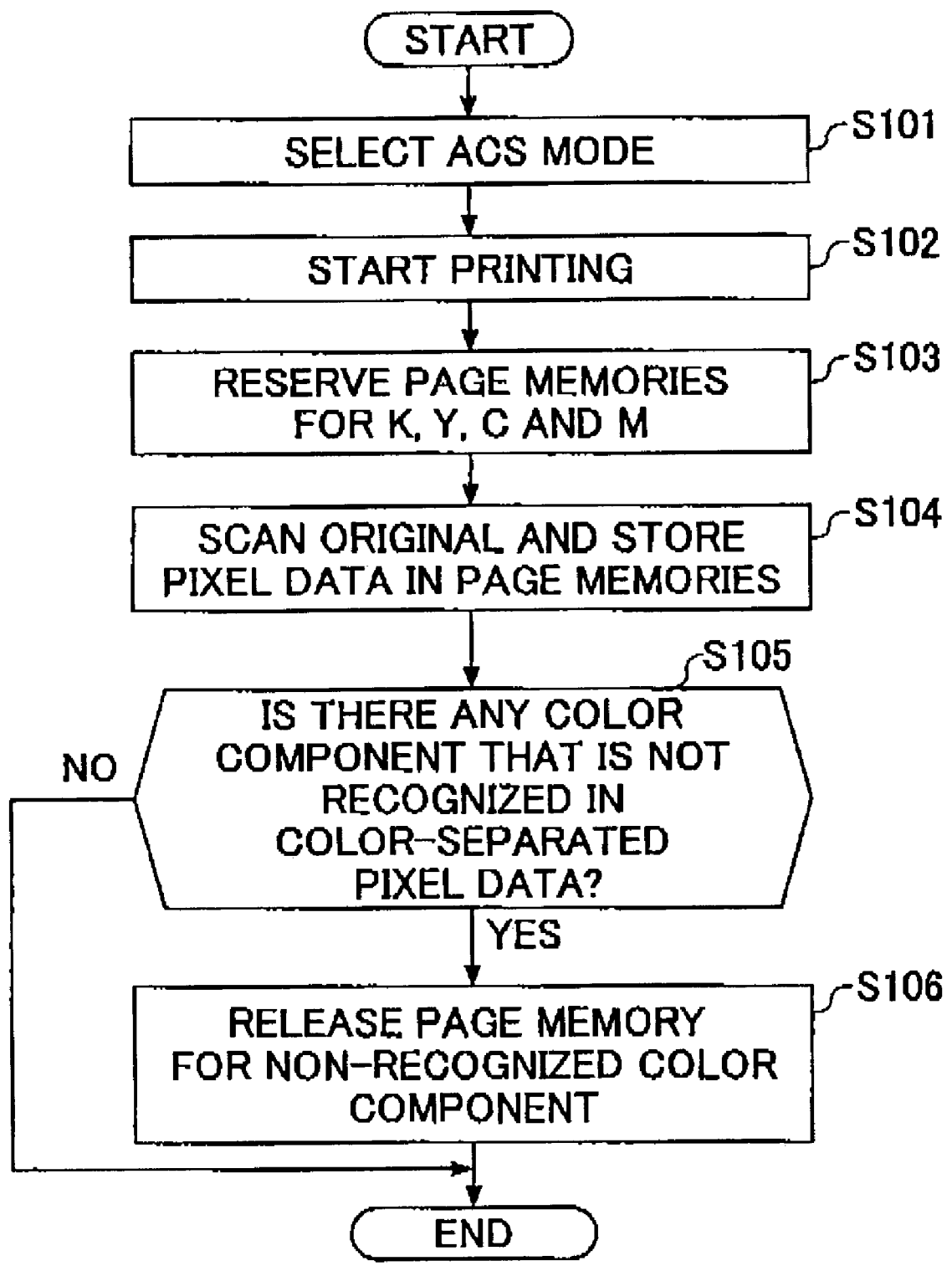
FIG. 7 is a flowchart showing an example of memory regions management, releasing a part of the page memory regions that stores YMCK pixel data.

FIG. 7 illustrates the operation flow of the digital hybrid imaging apparatus 1 implemented when reading an image from the original and storing the image as YMCK pixel data in page memory regions 44.

In step S101, the automatic color selection (ACS) mode is selected through the operation panel 49. In step S102, the start key is hit to request the main controller 41 to start the printing operation. In response to the print start request, the CPU 46 of the main controller 41 produces an image reading request and supplies it to the scanner IPU 43 mode.

Then, in step S103, the main controller 41 reserves four page memory regions 44 corresponding to K, Y, C, and M, assuming that the image on the original is a full-color image.

In response to the image reading request, the scanner IPU 43 causes the scanner 5 to start reading the image from the original in the ACS mode. The scanner 5 reads all the color components of the image at a single scanning operation. The pixel signals of the scanned image are subjected to various processing and supplied to the main controller 47.

In step S104, the main controller 41 stores the pixel data of the respective color components in the assigned page memory regions 44. Each of the page memory regions 44 stores color-separated pixel data of the assigned color component. The color determination unit 50 of the scanner IPU 43 determines whether there is any color component that has not been recognized as a significant image because of containing an insignificant or a negligible quantity, among the pixel data of K, Y, C and M stored in the page memory regions 44. The determination result is supplied to the main controller 41.

In step S105, the main controller 41 analyzes the color determination result and branches the operations depending on the analysis. If there is no color component that is not recognized in the color-separated pixel data stored in the page memory regions 44 (NO in step S105), that is, if all the color components of Y, M, C, and K are recognized in the color-separated pixel data stored in the respective page memory regions 44, then the process terminates, while maintaining all of the four page memory regions 44. If there is any color component, among Y, M, C and K, that is not recognized in the color-separated pixel data (YES in step S105), then the process proceeds to step S106, in which the page memory region that stores the color-separated pixel data of the non-recognized color component is released.

Figure 8:
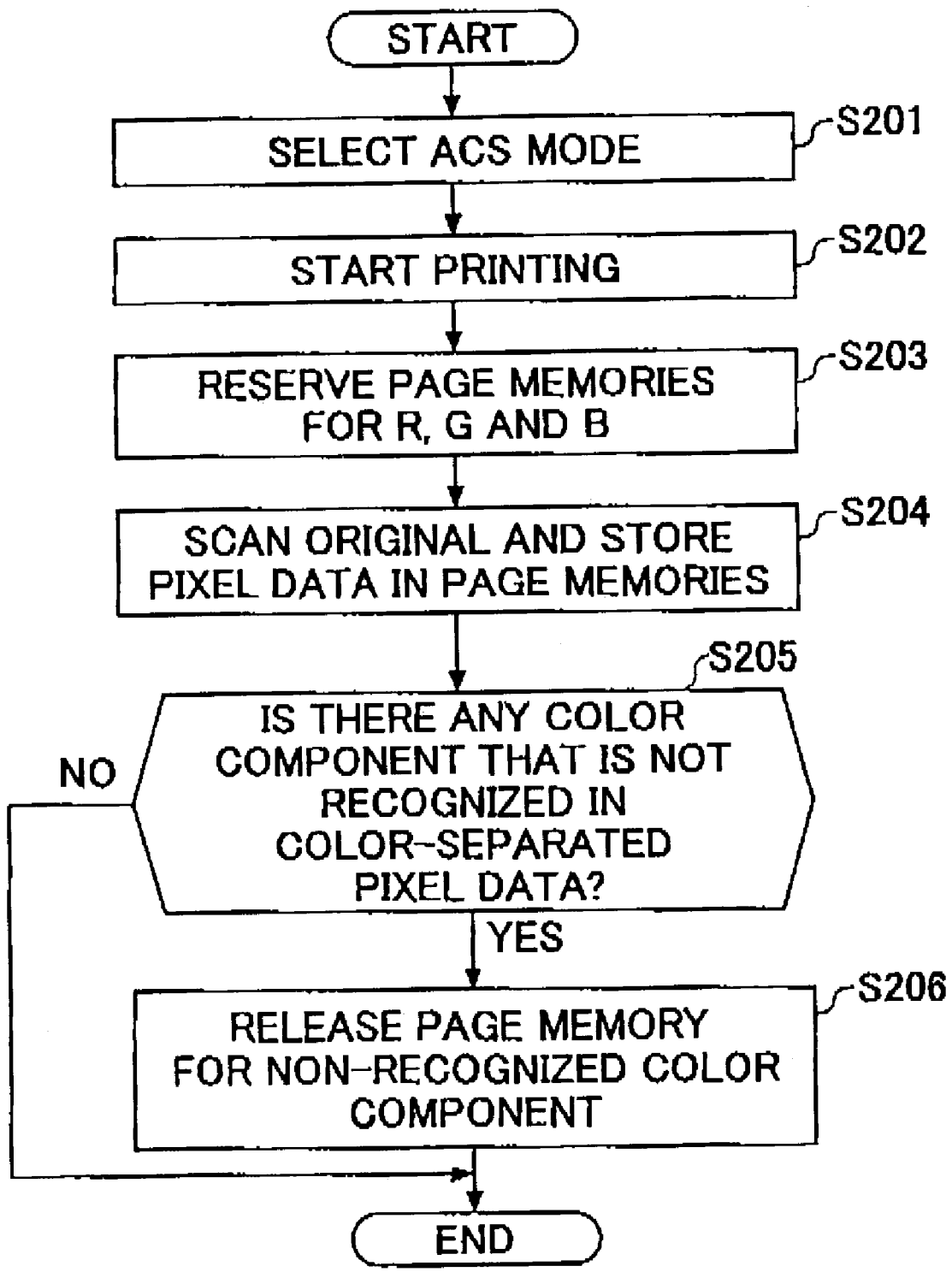
FIG. 8 is a flowchart showing an example of page memory management, releasing a part of the page memory regions that stores RGB pixel data.

FIG. 8 illustrates the operation flow of the digital hybrid imaging apparatus 1 implemented when reading an image from the original and storing the image as RGB pixel data in page memory regions 44.

The operation flow shown in FIG. 8 is similar to that shown in FIG. 7, the only difference being step S203, in which the main controller 41 reserves three page memory regions 44 corresponding to R, G and B. This arrangement allows the digital hybrid imaging apparatus 1 to receive RGB pixel data, which are generally used in personal computers or cellular phones with digital cameras, and to store the RGB pixel data directly in the page memory regions. This arrangement is suitable for above-described Web services.

Figure 9:
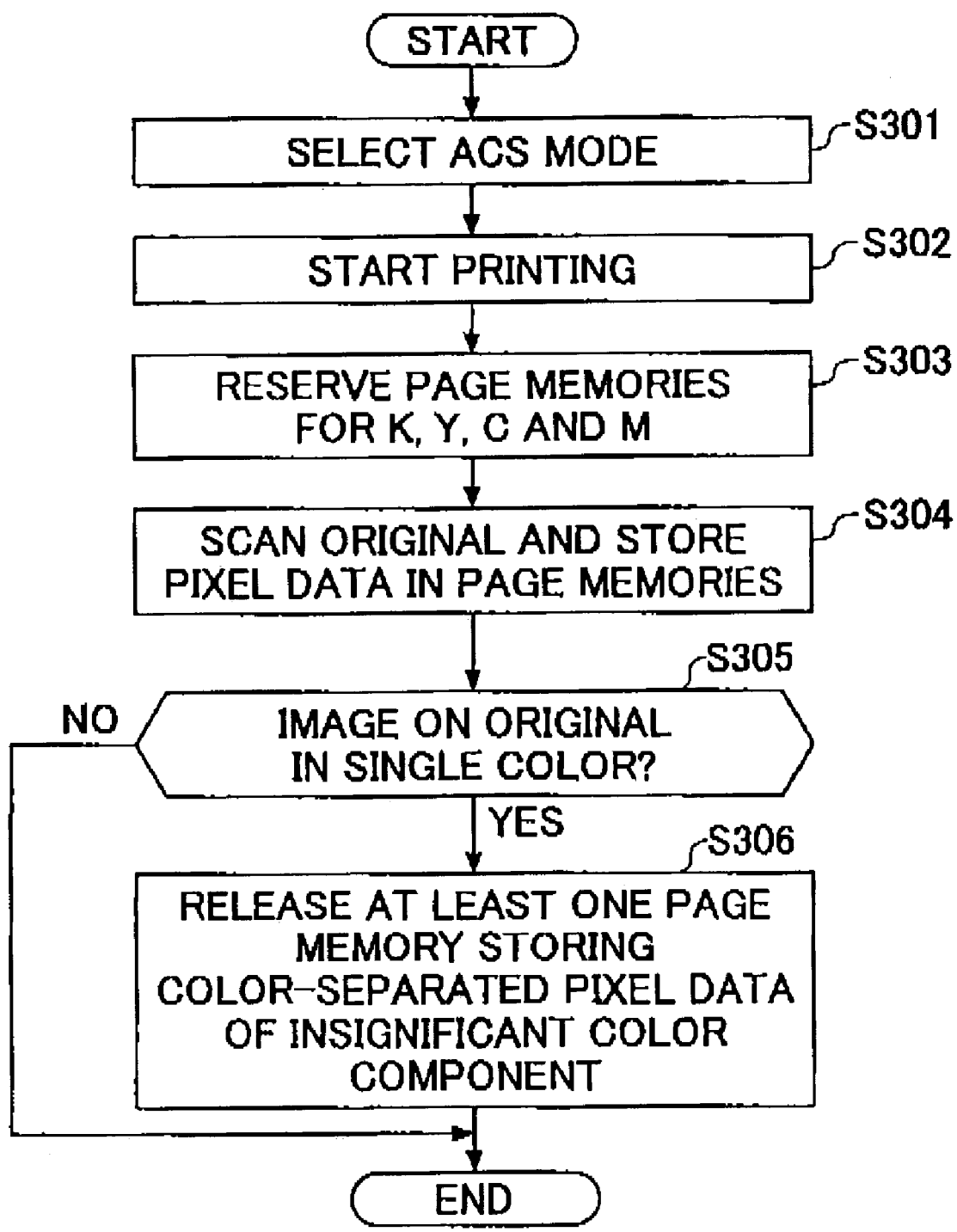
FIG. 9 is a flowchart showing an example of page memory management, releasing a part of the page memory regions when the image read from the original is in a single color.

FIG. 9 illustrates the operation flow of the digital hybrid imaging apparatus 1 when the scanned image is in a single color.

The operations of steps S301 through S304 are the same as those shown in FIG. 7 and FIG. 8, and the explanation thereof will be omitted. In step S305, the main controller 41 determines whether the image read from the original is in a single color. This determination is made based on the information from the scanner IPU 43.

If the image read from the original is not a single-color image (NO in step S305), the process terminates, while maintaining the reserved page memory regions 44. If the scanned image is in a single color (YES in step S305), the process proceeds to step S306, in which the main controller 41 releases one or more page memory regions 44 storing the color-separated pixel data of the insignificant color components for the scanned image.

For example, if it is determined that the pixel data of the scanned image are substantially comprised of K (black) pixel data, then the page memory regions 44 corresponding to Y, M, and C are released. The released page memory regions 44 become available for the reading and storing operations of the next original, or temporarily storing the pixel data read out of the HDD 45. In this manner, page memory regions 44 are used efficiently.

It should be appreciated that the operation flow shown in FIG. 9 is equally applicable to the case in which RGB pixel data are stored in the page memory regions 44.

Figure 10:
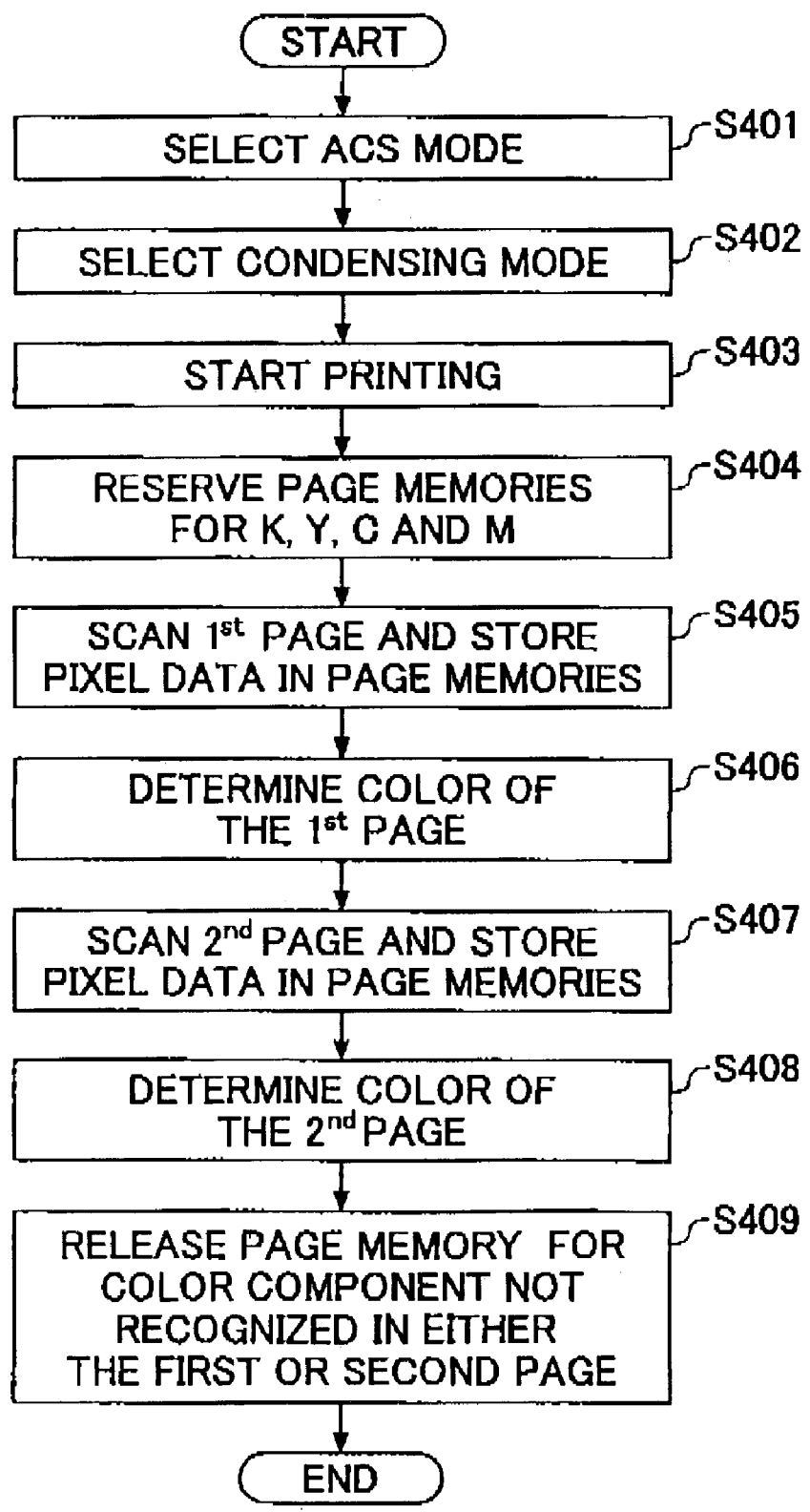
FIG. 10 is a flowchart showing an example of page memory management, releasing a part of the page memory regions when reproducing the images read from multiple pages of the originals in a single sheet.

FIG. 10 illustrates the page memory control operation of the digital hybrid imaging apparatus 1 when reproducing two pages of original into a single sheet in the condensing mode. For example, two A4 size originals are copied on a single A3 size paper, while reducing the size of the original images.

In step S401, the automatic color selection (ACS) mode is selected through the operation panel 49, and the condensing mode is selected in step S402. In step S403, the start key is hit to start printing. Upon the print start request, the main controller 41 generates an image reading request and supplies this request to the scanner IPU 43. In step S404, the main controller 41 reserves four page memory regions 44 for K, Y, C and M pixel data, assuming that the scanned images are full-color images.

On the other hand, the scanner IPU 43 causes the scanner 5 to read the first page of the original in the ACS mode, based on the image reading request. The scanner 5 reads all the color components of the image contained in the first page of the original at a single scan. The pixel signals of the scanned image are subjected to various processing, and supplied to the main controller 41.

In step S405, the main controller 41 stores the pixel data of the first page of the original image in the page memory regions 44. In step S406, the color determination unit 50 of the scanner IPU 43 determines whether the color components of K, Y, C, and M of the scanned image of the first page of the original are significant enough to be recognized, and supplies the determination result to the main controller 41.

Subsequently, the scanner IPU 43 causes the scanner 5 to read the second page of the original, and provides various processing to the pixel data of the scanned image. The processed pixel data are supplied to the main controller 41. In step S407, the main controller 41 stores the pixel data of the second page of the original in the page memory regions 44.

The color determination unit 50 of the scanner IPU 43 determines whether or not the color components of K, Y, C, and M of the scanned image of the second page of the original are significant enough to be recognized, and supplies the determination result to the main controller 41.

In step S409, based on the determination results of the first and second pages, the main controller 41 releases the page memory region that stores the pixel data of the color component that is not recognized in either the first or second page of the original.

For example, if the pixel data of both the first and second pages of the original are substantially comprised of the K k component, the page memory regions 44 for the Y, M, and C components are released. If the pixel data of the first page of the original are comprised of the K component, and if the pixel data of the second page of the original are substantially composed of the M component, then the page memory regions 44 corresponding to the Y and C components are released. If at least one of the first and second pages of the original contains a fullcolor image, all four of page memory regions 44 are maintained.

The operation flow illustrated in FIG. 10 is equally applicable to the RGB pixel data. In this case, three page memory regions 44 are reserved for the color components of R, G, and B.

Figure 11:
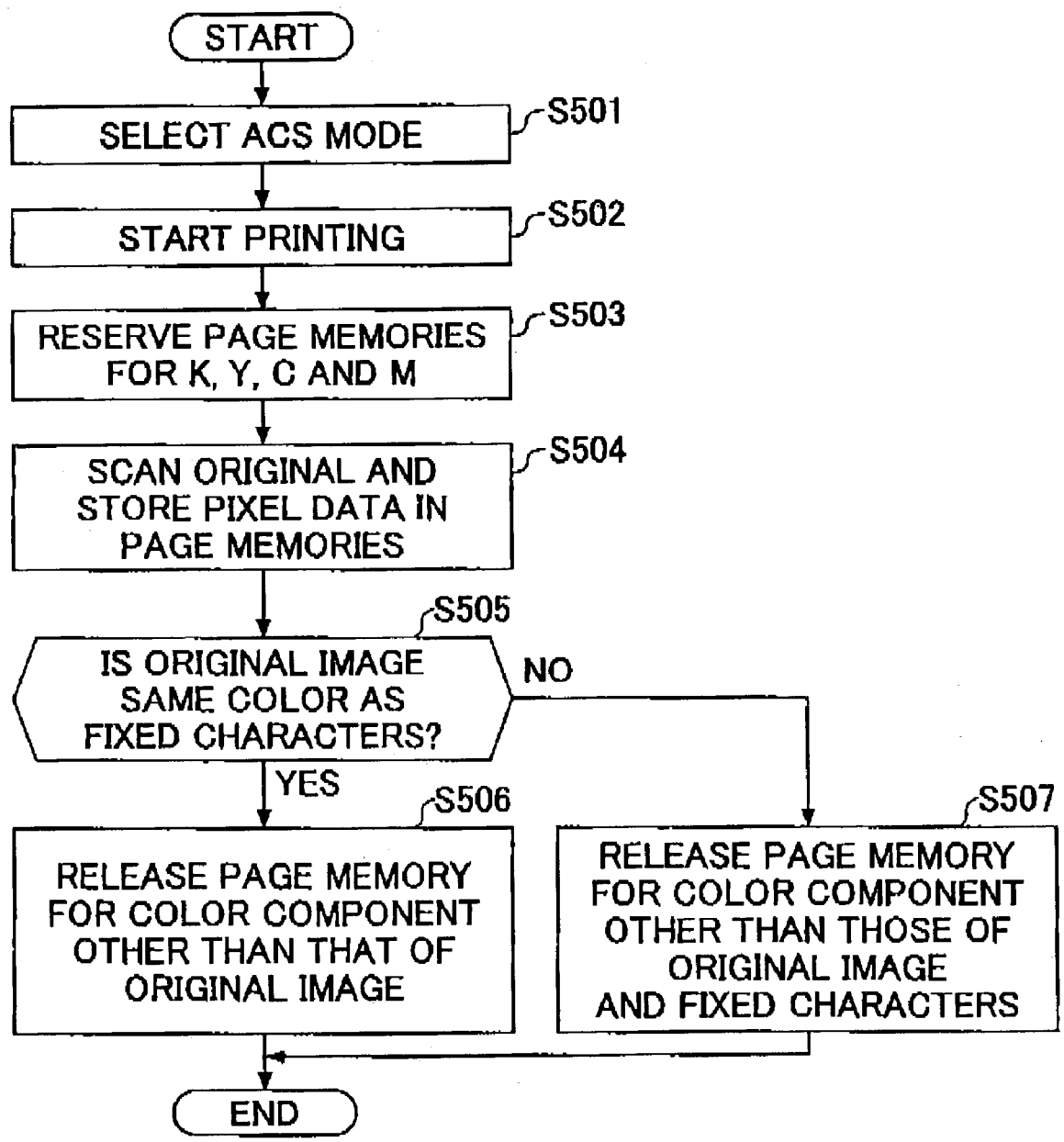
FIG. 11 is a flowchart showing an example of page memory management, releasing a part of the page memory regions when incorporating fixed characters in the reproduced image.

FIG. 11 illustrates the operation flow of the digital hybrid imaging apparatus 1 when adding other image data to the pixel data of the scanned image. In the example shown in FIG. 11, fixed characters are added to the scanned image during the reproduction of the image. Fixed characters include, for example, the page number, the date, and the specific symbols. The fixed characters may be stored in a memory region of the digital hybrid imaging apparatus 1, or alternatively, can be acquired from other devices through the network. The fixed characters can be printed in desired colors.

In the digital hybrid imaging apparatus 1 of the present invention, the page memory region assigned to the color component that is not recognized as being significant in the pixel data of the scanned image is released for other jobs. Accordingly, some modifications are required to combine the fixed characters of an arbitrary color with the scanned pixel data, avoiding the situation where the fixed characters cannot be printed because of the release of the page memory region when the color of the fixed characters is not contained in the scanned image. To this end, color comparison is carried out between the fixed characters and the scanned image before the release of the page memory region.

In step S501, the ACS mode is selected. In step S502, the start key is hit and a print start request is supplied to the main controller 41. The main controller 41 produces an image reading request to the scanner IPU 43. In step S503, the main controller 41 reserves four page memory regions 44 for K, Y, C, and M components, assuming that the image on the original is a full-color image.

On the other hand, the scanner IPU 43 causes the scanner 5 to start reading the original in response to the image reading request supplied from the main controller 41. The scanner 5 reads all the color components of the original image at a single scanning operation. The pixel signals of the scanned image are subjected to various processing, and supplied to the main controller 41.

In step S504, the main controller 41 stores the pixel data in the assigned page memory regions 44. The color determination unit 50 of the scanner IPU 43 determines whether color components of K, Y, C, and M are recognized as significant pixel data, and supplies the determination result to the main controller 41.

In step S505, the main controller 41 determines whether the color of the fixed characters to be added to the reproduced image is the same as any one of the recognized color components of the scanned image. If the color of the fixed characters is the same as any one of the recognized color components (YES in S505), then the page memory region for a color component other than the recognized color components of the scanned image becomes unnecessary, and therefore, the main controller 41 releases the unnecessary page memory in step S506.

If the color of the fixed characters is not included in the recognized color components of the scanned image (NO in step S505), then the process proceeds to step S507, in which the main controller 41 releases the page memory region corresponding to the color component that is not contained in either the fixed characters or the scanned image.

This arrangement allows the page memory regions to be efficiently used even if other image data, such as fixed characters representing the page number or the date are added to the scanned image.

Figure 12:
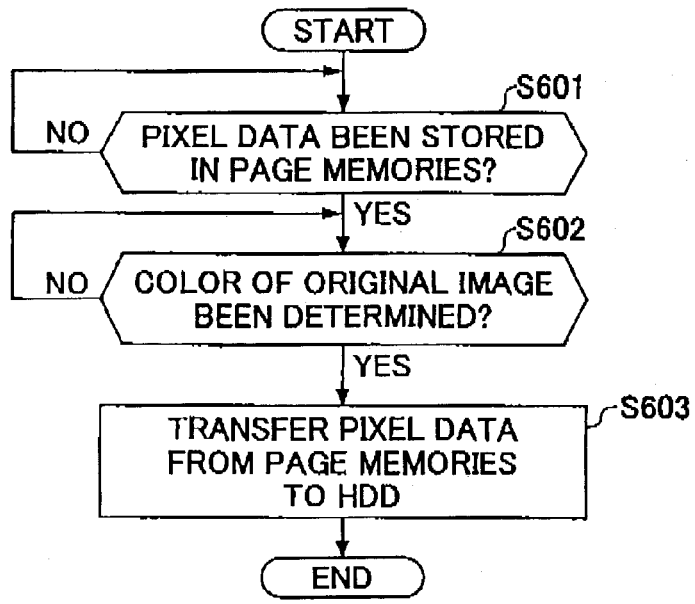
FIG. 12 is a flowchart showing an example of transferring the pixel data from the page memory regions to the hard disk drive.

FIG. 12 illustrates the operation flow of transferring the pixel data from the page memory regions 44 to the HDD 45 when the transfer rate of the pixel data from the page memory regions 44 to the HDD 45 is greater than the rate of storing the pixel data in the page memory regions 44 in the digital hybrid imaging apparatus 1.

When the pixel data transfer rate from the page memory regions 44 to the HOD 45 is greater than the rate of storing the pixel data in the page memory regions 44, the main controller 41 starts transferring the pixel data from the page memory regions 44 to the HDD 45 after the pixel data of the scanned image have been stored in the page memory regions 44 (YES in step S601).

However, even if the scanned pixel data have been stored in the assigned page memory regions 44, the color determination may not have been made yet. If color determination is made during the process of transferring the pixel data of a color component (for example, the Y component) other than black (K) to the HDD 45 from the page memory region 44, then the transfer of the pixel data of the Y component has to be stopped depending on the color determination result. In addition, the pixel data stored in the HDD 45 has to be corrected to cause the pixel data of the K component (or other color component as necessary) to be transferred from the assigned page memory region 44 to the HDD 45. Such a troublesome process degrades the performance of the digital hybrid imaging apparatus 1.

To avoid this inconvenience, it is determined in step S602 whether color determination is made after the pixel data of the scanned image have been stored in the assigned page memory regions 44. If the color determination is made (YES in S602), the main controller 41 causes the pixel data to be transferred from the page memory regions 44 to the HDD 45 based on the color determination result in step S603. This arrangement can avoid unnecessary access to and use of the HDD 45.

For example, if the black (K) component and the magenta (M) component are recognized as being significant in the pixel data of the scanned image, then, the main controller 41 releases the page memory regions 44 for the yellow (Y) and cyan (C) components, while transferring the pixel data of the black and magenta components from the assigned page memory regions 44 to the HDD 45.

Figure 13:
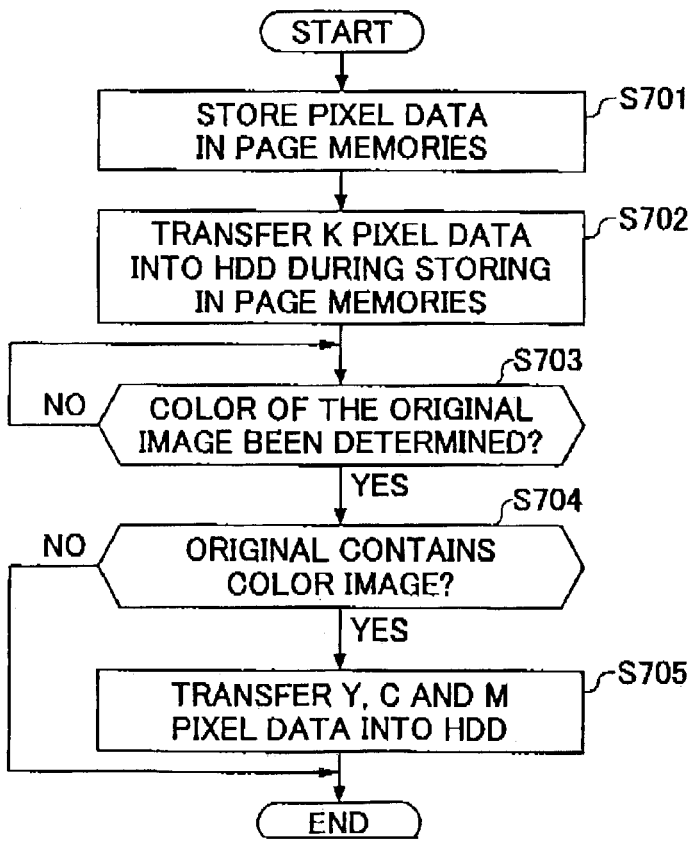
FIG. 13 is a flowchart showing another example of transferring the pixel data from the page memory regions to the hard disk drive.

FIG. 13 illustrates the operation flow of transferring the pixel data from the page memory regions 44 to the HDD 45 when the pixel data transfer rate from the page memory regions 44 to the HDD 45 is slower than the rate of storing the pixel data in the assigned page memory regions 44. In this case, the pixel data are transferred from the page memory regions 44 to the HDD 45 depending on the data accumulation state of the memory regions 44 First, in step S701, the pixel data are in the process of being stored in the assigned page memory regions 44. In step S702, the main controller 41 causes the pixel data of the K component to be transferred from the assigned page memory region 44 to the HDD 45, while the pixel data of the scanned image are being stored in the page memory regions 44. Then in step S703 color determination is made after the entire image of the original has been read.

In step S704, it is determined whether the original contains a color image. To be more precise, determination is made whether color components other than the K component are recognized in the scanned pixel data. If there is a color component other than the K component recognized in the pixel data of the scanned image (YES in step S704), the pixel data of that color component are transferred from the page memory region 44 to the HDD 45 in step S705. If no color component other than the K component is recognized in the scanned image (NO in step S704), the main controller 41 releases the page memory regions 44 for the unrecognized color components, without transferring the pixel data to the HDD 45, to terminate the process.

The arrangement shown in FIG. 13 can realize high-speed access to the HDD 45, and therefore, the performance and the productivity of the digital hybrid imaging apparatus 1 are improved.

As has been described above, the memory region (such as the page memory) can be used efficiently by identifying the color components recognized as being significant in the pixel data of the scanned image and by releasing the memory region assigned to an unrecognized color component for other jobs. The efficient use of memory resources can improve the productivity of the digital hybrid imaging apparatus.

The above-described page memory management is applied efficiently when reproducing multiple pages of original images into a single sheet in the condensed reproduction mode. In this case, color determination is made for each page of the original, and availability of memory regions for release is determined based on the color determination results throughout the pages.

The page memory management is also applicable when reproducing an image in combination with other image data, such as fixed characters representing the page number or the date. In this case, the page memory region assigned to a color component that is not recognized in either the scanned image or the fixed characters is released.

Furthermore, the above-described page memory management can improve the efficiency of accessing the hard disk drive when transferring pixel data from the page memory region to the hard disk drive. The page memory management of the present invention realizes high-speed access, while avoiding unnecessary access, to the hard disk drive.

Especially when transferring pixel data from the page memory region to the hard disk drive before the release of the page memory region for an unrecognized color component, priority is given to transferring the pixel data of the K component. The pixel data of other color components recognized in the scanned image are transferred to the hard disk drive after the color determination, so that the memory region assigned to the unrecognized color component is released without data transfer to the hard disk drive. Accordingly, the performance of data storage in the hard disk drive is improved, and the productivity of total image formation is increased.

Although, the present invention has been described using an example of page memory management when reproducing an image by making a photocopy, the invention is equally applied to reproduction of images from the data supplied from a personal computer or the Internet through the network. The pixel data can be either RGB components or YMCK components.

This patent application is based on and claims the benefit of the earlier filing dates of Japanese patent application No. 2002-000218 filed Jan. 7, 2002 and Japanese patent application No. 2002-378303 filed Dec. 26, 2002, the entire contents of which are hereby incorporated by reference.

What is claimed is:

1. An imaging apparatus that reads an image from an original while analyzing the image into pixel data of a plurality of color components, and reproduces the image from the pixel data, the imaging apparatus comprising:
   a memory region reservation unit that reserves a plurality of memory regions for storing the pixel data of the color components before completion of a reading of the original image, each memory region being assigned to one of the color components;
   a color determination unit that makes a color determination as to whether any of the color components are detected as having a representation in the pixel data that is below a predetermined threshold; and
   a memory region releasing unit that releases each memory region which corresponds to a color component that is determined to have a representation in the pixel data that is below the predetermined threshold by the color determination unit.

2. The imaging apparatus according to claim 1, wherein when the color determination unit determines that the image read from the original is a single color image, then the memory region releasing unit releases one or more memory regions assigned to the color components other than said single color.

3. The imaging apparatus according to claim 1, wherein when the image is read from multiple pages of the original, the memory region releasing unit releases the memory region assigned to the pixel data of the color component that is determined to have a representation in the pixel data that is below the predetermined threshold in each of the multiple pages of the original.

4. The imaging apparatus according to claim 1, further comprising an image data incorporation unit that adds image data to an original image data when reproducing the image, wherein the memory region releasing unit releases the memory region assigned to the pixel data of the color component that is determined to have a representation in the pixel data that is below the predetermined threshold in either the original image data or the added image data.

5. The imaging apparatus according to claim 4, wherein the added image data include fixed characters.

6. The imaging apparatus according to claim 4, further comprising a communication unit that acquires the image data to be added through a network.

7. The imaging apparatus according to claim 6, wherein the communication unit acquires the image data comprised of red, green, and blue components.

8. The imaging apparatus according to claim 1, further comprising a pixel data transfer unit that transfers the pixel data stored in the memory region to an external storage after the memory region corresponding to the color component that is determined to have a representation in the pixel data that is below the predetermined threshold is released.

9. The imaging apparatus according to claim 8, wherein the pixel data transfer rate of the pixel data transfer unit is faster than the pixel data storing rate of the memory regions.

10. The imaging apparatus according to claim 1, further comprising a pixel data transfer unit that transfers the pixel data of at least one color component from the memory region to an external storage before the color determination unit makes the color determination, and that transfers the pixel data of the rest of the color components recognized in the image to the external storage after the color determination unit makes the color determination.

11. The imaging apparatus according to claim 10, wherein the pixel data transfer rate of the pixel data transfer unit is slower than the pixel data storing rate of the memory regions.

12. The imaging apparatus according to claim 10, wherein the pixel data transfer unit transfers the pixel data of the black component of the color components from the memory region to the external storage before the color determination unit makes the color determination.

13. The imaging apparatus according to claim 1, wherein the imaging apparatus analyzes the image read from the original into the pixel data of yellow, magenta, cyan, and black components.

14. The imaging apparatus according to claim 1, wherein the imaging apparatus analyzes the image read from the original into the pixel data of red, green, and blue components.

15. The imaging apparatus according to claim 1, further comprising a first conversion unit that converts the pixel data comprised of red, green, and blue components into the pixel data comprised of yellow, magenta, cyan, and black components.

16. The imaging apparatus according to claim 15, wherein the first conversion unit includes a gamma conversion unit, a color correction unit, an under color removal unit, and a gradation processing unit.

17. The imaging apparatus according to claim 15, further comprising a second conversion unit that converts the pixel data comprised of yellow, magenta, cyan, and black components into the pixel data comprised of red, green, and blue components.

18. The imaging apparatus according to claim 17, wherein the second conversion unit includes a color conversion unit and a color density correction unit.

19. The imaging apparatus according to claim 1, further comprising a Web page implementation unit that implements a service provided on a Web site.

20. The imaging apparatus according to claim 1, further comprising hardware resources required to reproduce the image, and one or more programs used in conjunction with the reproduction of the image.

* * * * *